(12) United States Patent
Hayashi

(10) Patent No.: US 11,638,223 B2
(45) Date of Patent: Apr. 25, 2023

(54) BASE STATION FOR LTE (LONG TERM EVOLUTION)

(71) Applicant: NEC CORPORATION, Tokyo (JP)

(72) Inventor: Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/572,338

(22) PCT Filed: May 9, 2016

(86) PCT No.: PCT/JP2016/002266
§ 371 (c)(1),
(2) Date: Nov. 7, 2017

(87) PCT Pub. No.: WO2016/185686
PCT Pub. Date: Nov. 24, 2016

(65) Prior Publication Data
US 2018/0124717 A1 May 3, 2018

(30) Foreign Application Priority Data

May 15, 2015 (JP) .............................. JP2015-100153

(51) Int. Cl.
| H04W 56/00 | (2009.01) |
| H04W 72/04 | (2009.01) |
| H04W 16/02 | (2009.01) |
| H04W 24/02 | (2009.01) |
| H04W 16/32 | (2009.01) |

(Continued)

(52) U.S. Cl.
CPC ......... *H04W 56/001* (2013.01); *H04W 16/02* (2013.01); *H04W 16/32* (2013.01); *H04W 24/02* (2013.01); *H04W 56/00* (2013.01); *H04W 72/04* (2013.01); *H04W 72/0446* (2013.01); *H04W 88/08* (2013.01)

(58) Field of Classification Search
CPC ..... H04W 16/02; H04W 16/32; H04W 24/02; H04W 56/00; H04W 56/001; H04W 72/04; H04W 72/0446; H04W 88/08
USPC ........................................................ 370/336
See application file for complete search history.

(56) References Cited

U.S. PATENT DOCUMENTS

| 2011/0081933 A1 | 4/2011 | Suh et al. |
| 2017/0105187 A1* | 4/2017 | Centonza .......... H04W 56/0025 |

FOREIGN PATENT DOCUMENTS

| WO | 2013068041 A1 | 5/2013 |
| WO | 2014142628 A2 | 9/2014 |

OTHER PUBLICATIONS

ETSI TS 136 413 V12.4.0, ("LTE; Evolved Universal Terrestrial Radio Access Network (E-UTRAN); S1 Application Protocol (S1AP) (3GPP TS 36.413 version 12.4.0 Release 12)", Feb. 2015 (Year: 2015).*

(Continued)

*Primary Examiner* — Melvin C Marcelo
*Assistant Examiner* — Natali Pascual Peguero

(57) ABSTRACT

There is provided a base station which can prevent transmission of a Time Synchronisation Info IE (Information Element) from causing a procedure which the base station cannot execute. When the base station (10-1) according to the present invention receives Muting Pattern Information which does not contain a Muting Pattern Offset, the base station (10-1) decides that the Muting Pattern Offset requested in a former request has been accepted.

12 Claims, 10 Drawing Sheets

9.2.3.26 SON Configuration Transfer
This IE contains the configuration information, used by e.g., SON functionality, and additionally includes the eNB identifier of the destination of this configuration information and the eNB identifier of the source of this information.

| IE/Group Name | Presence | Range | IE type and reference | Semantics description | Criticality | Assigned Criticality |
|---|---|---|---|---|---|---|
| SON Configuration Transfer | | | | | | |
| >Target eNB-ID | M | | | | | |
| >>Global eNB ID | M | | 9.2.1.37 | | | |
| >>Selected TAI | M | | TAI 9.2.3.16 | | | |
| >Source eNB-ID | M | | | | | |
| >>Global eNB ID | M | | 9.2.1.37 | | | |
| >>Selected TAI | M | | TAI 9.2.3.16 | | | |
| >SON Information | M | | 9.2.3.27 | | | |
| >X2 TNL Configuration Info | C-ifSONInformationRequest | | 9.2.3.29 | Source eNB X2 TNL Configuration Info. | YES | ignore |
| >Synchronisation Information | C-if Activate Muting | | 9.2.3.42 | Information on cell selected as source of synchronisation and aggressor cells. | YES | ignore |
| >Cause | | | 9.2.1.3 | | | |

| Condition | Explanation |
|---|---|
| ifSONInformationRequest | This IE shall be present if the SON Information IE contains the SON Information Request IE set to "X2TNL Configuration Info" |
| ifActivateMuting | This IE shall be present if the SON Information IE contains the SON Information Request IE set to "Activate Muting" |

(51) Int. Cl.
*H04W 72/0446* (2023.01)
*H04W 88/08* (2009.01)

(56) References Cited

OTHER PUBLICATIONS

Nokia Networks ("Rapporteur Review-ASN.1 consistency check"; 3GPP TSG-RAN WG3 Meeting #87, R3-150388, Athens, Greece , Feb. 9-13, 2015 (Year: 2015).*
3 GPP TS 36.413 V12.4.0, "3rd Generation Partnership Project; Technical Specification Group Radio Access Network; Evolved Universal Terrestrial Radio Access Network (E-UTRAN); S1 Application Protocol (S1AP), (Release 12)" Dec. 2014, 300 pages.
3GPP TSG-RAN WG3 Meeting #87bis, "Correction of Muting procedure", Apr. 10, 2015, 3 pages, R3-150603.
3GPP TSG-RAN WG3#87bis, "Clarification of the muting procedure for RIBS", Apr. 20-24, 2015, 5 pages, R3-150602.
3GPP TSG-RAN WG3#87bis, "Way Forward of the Clarification of the muting procedure for RIBS", Apr. 20-24, 2015, 4 pages, R3-150886.
3G99 TSG-RAN WG3#88, "Way Forward of the Clarification of the muting procedure for RIBS", May 25-29, 2015, 4 pages, R3-150999.
International Search Report for PCT/JP2016/002266 dated Jul. 19, 2016 [PCT/ISA/210].
Communication dated Nov. 12, 2018 from the European Patent Office in counterpart application No. 16796082.2.

* cited by examiner

9.2.3.41 Muting Pattern Information

This information element contains muting pattern information that can be used for over-the-air synchronisation using network listening.

| IE/Group Name | Presence | Range | IE type and reference | Semantics description |
|---|---|---|---|---|
| Muting Pattern Period | M | | ENUMERATED (0, 1280, 2560, 5120, 10240, ...) | Period for repetition of muted subframe in milliseconds. Value '0' indicates that the muting request is not fulfilled. |
| Muting Pattern Offset | C-ifOtherThanZero | | INTEGER (0..10239,...) | Offset in number of subframes of the muting pattern starting from subframe 0 in a radio frame where SFN = 0. |

| Condition | Explanation |
|---|---|
| ifOtherThanZero | This IE shall be present if the Muting Pattern Period IE is set to value other than "0". |

Fig. 6

9.2.3.41 Muting Pattern Information

This information element contains muting pattern information that can be used for over-the-air synchronisation using network listening.

| IE/Group Name | Presence | Range | IE type and reference | Semantics description |
|---|---|---|---|---|
| Muting Pattern Period | M | | ENUMERATED (0, 1280, 2560, 5120, 10240, ....) | Period for repetition of muted subframe in milliseconds. Value '0' indicates that the muting request is not fulfilled. |
| Muting Pattern Offset | O | | INTEGER (0..10239,....) | Offset in number of subframes of the muting pattern starting from subframe 0 in a radio frame where SFN = 0. <u>If this IE is not present, the receiving eNB may consider the requested muting pattern offset in the former request has been accepted.</u> |

Fig. 7

9.2.3.26 SON Configuration Transfer

This IE contains the configuration information, used by e.g., SON functionality, and additionally includes the eNB identifier of the destination of this configuration information and the eNB identifier of the source of this information.

| IE/Group Name | Presence | Range | IE type and reference | Semantics description | Criticality | Assigned Criticality |
|---|---|---|---|---|---|---|
| SON Configuration Transfer | | | | | | |
| >Target eNB-ID | M | | | | | |
| >>Global eNB ID | M | | 9.2.1.37 | | | |
| >>Selected TAI | M | | TAI 9.2.3.16 | | | |
| >Source eNB-ID | M | | | | | |
| >>Global eNB ID | M | | 9.2.1.37 | | | |
| >>Selected TAI | M | | TAI 9.2.3.16 | | | |
| >SON Information | M | | 9.2.3.27 | | | |
| >X2 TNL Configuration Info | C-ifSONInformationRequest | | 9.2.3.29 | Source eNB X2 TNL Configuration Info. | YES | ignore |
| >Synchronisation Information | C-if ActivateMuting | | 9.2.3.42 | Information on cell selected as source of synchronisation and aggressor cells. | YES | ignore |
| >Cause | M | | 9.2.1.3 | | | |

| Condition | Explanation |
|---|---|
| ifSONInformationRequest | This IE shall be present if the SON Information IE contains the SON Information Request IE set to "X2TNL Configuration Info" |
| ifActivateMuting | This IE shall be present if the SON Information IE contains the SON Information Request IE set to "Activate Muting" |

Fig. 8

9.2.3.27 SON Information

This IE identifies the nature of the configuration information transferred, i.e., a request, a reply or a report.

| IE/Group Name | Presence | Range | IE type and reference | Semantics description | Criticality | Assigned Criticality |
|---|---|---|---|---|---|---|
| CHOICE SON Information | M | | | | | |
| >SON Information Request | | | | | | |
| >>SON Information Request | M | | ENUMERATE D(X2 TNL Configuration Info, ..., Time synchronisation Info, Activate Muting, Deactivate Muting, Error Indication) | | – | |
| >SON Information Reply | | | | | | |
| >>SON Information Reply | M | | 9.2.3.28 | | – | |
| >SON Information Report | | | | | | |
| >>SON Information Report | M | | 9.2.3.39 | | YES | ignore |

Fig. 9

BASE STATION FOR LTE (LONG TERM EVOLUTION)

CROSS REFERENCE TO RELATED APPLICATIONS

This application is a National Stage of International Application No. PCT/JP2016/002266 filed on May 9, 2016, claiming priority based on Japanese Patent Application No. 2015-100153 filed on May 15, 2015, the contents of all of which are incorporated herein by reference in their entirety.

TECHNICAL FIELD

The present invention relates to a base station, a wireless communication system and a communication method.

BACKGROUND ART

FIG. 1 is a view illustrating a configuration example of a wireless communication system of LTE (Long Term Evolution). The wireless communication system illustrated in FIG. 1 includes an eNB (evolved Node B) (#1) 10-1, an eNB (#2) 10-2, an eNB (#3) 10-3, a MME (Mobility Management Entity) 20-1 and a MME 20-2. In this regard, FIG. 1 illustrates only components necessary for description of the present invention, and does not illustrate other components.

The MME 20-1 and the MME 20-2 are core network nodes (Core Network node) which are installed in a core network (CN) and manage movement of terminals which are not illustrated.

The eNB (#1) 10-1, the eNB (#2) 10-2 and the eNB (#3) 10-3 are base stations which perform wireless communication with the terminals which are not illustrated. The eNB (#1) 10-1 is a pico eNB which forms a picocell. The eNB (#2) 10-2 is a micro eNB which forms a microcell whose cell radius is larger than that of the picocell. The eNB (#3) 10-3 is a macro eNB which forms a macrocell whose cell radius is larger than that of the microcell. Further, the eNB (#1) 10-1, the eNB (#2) 10-2 and the eNB (#3) 10-3 have a neighboring relationship that at least part of cells overlap each other. This neighboring relationship includes that, for example, the cell of the eNB (#3) 10-3 includes the cells of the eNB (#1) 10-1 and the eNB (#2) 10-2.

When the eNB (#1) 10-1 performs time synchronisation with the eNB (#3) 10-3 by radio (hereinafter, the time synchronisation by radio will be appropriately referred to as "over-the-air synchronisation"), the eNB (#1) 10-1 receives a synchronisation signal transmitted from the eNB (#3) 10-3 to the cell of the eNB (#3) 10-3 by using network listening. Further, the eNB (#1) 10-1 performs over-the-air synchronisation with the eNB (#3) 10-3 based on the synchronisation signal received from the eNB (#3) 10-3.

However, when the eNB (#2) 10-2 and the eNB (#3) 10-3 transmit synchronisation signals at the same timing, the eNB (#1) 10-1 receives the synchronisation signal from the eNB (#2) 10-2, too. Then, it is concerned that the synchronisation signal from the eNB (#2) 10-2 becomes an interference wave, and the eNB (#1) 10-1 cannot receive the synchronisation signal from the eNB (#3) 10-3, and cannot perform over-the-air synchronisation with the eNB (#3) 10-3.

In such a case, a muting procedure of stopping transmission of the synchronisation signal from the eNB (#2) 10-2 is performed (Non-Patent Literature 1). This muting procedure will be described below. In this case, the eNB (#2) 10-2 which is an interference source can be expressed as an aggressor, and the eNB (#1) 10-1 which receives an interference can be expressed as a victim.

Case A)

In the case A, the eNB (#1) 10-1 tries to make an inquiry to the eNB (#2) 10-2 and the eNB (#3) 10-3 nearby in preparation for the over-the-air synchronisation. This will be described in detail with reference to FIG. 2.

The eNB (#1) 10-1 transmits an eNB CONFIGURATION TRANSFER message to a MME (the MME 20-1 in this case) (step 101). In this eNB CONFIGURATION TRANSFER message, a value "Time synchronisation Info" is set to a SON (Self Organizing Network) Information Request IE (Information Element). That is, this eNB CONFIGURATION TRANSFER message is a message for requesting time synchronisation information.

When the MME 20-1 receives the eNB CONFIGURATION TRANSFER message from the eNB (#1) 10-1, the MME 20-1 transmits a MME CONFIGURATION TRANSFER message to the eNB (#2) 10-2 and the eNB (#3) 10-3 (steps 102 and 103). Contents of the SON Information Request IE in this MME CONFIGURATION TRANSFER message is the same as the SON Information Request IE of the eNB CONFIGURATION TRANSFER message received from the eNB (#1) 10-1.

When the eNB (#2) 10-2 and the eNB (#3) 10-3 receive the MME CONFIGURATION TRANSFER message from the MME 20-1, the eNB (#2) 10-2 and the eNB (#3) 10-3 transmit the eNB CONFIGURATION TRANSFER messages to the MME 20-1 (steps 104 and 106). In this eNB CONFIGURATION TRANSFER message, a SON Information Reply IE contains the Time synchronisation Info IE which represents time synchronisation information. The Time synchronisation Info IE contains a Stratum Level IE which represents a synchronisation level and a Synchronisation Status IE which represents a synchronisation state, and, in addition, contains as an option a Muting Availability Indication IE which represents availability of muting. The Stratum Level IE has a value which becomes larger as a synchronisation level, i.e., synchronisation precision becomes lower. For example, the Stratum Level IE may indicate the highest "0" for an eNB which has established time synchronisation by a GPS (Global Positioning System) and therefore has high synchronisation precision, indicates the second highest "1" for an eNB which has established synchronisation with this eNB, and indicate the third highest "2" for an eNB which has established time synchronisation with this eNB. It is assumed that the Stratum Level IE indicates "0" for the eNB (#3) 10-3 and "1" for the eNB (#2) 10-2. Further, the SON Information IE may contain as an option a Muting Pattern Information IE which represents a muting pattern.

When the MME 20-1 receives the eNB CONFIGURATION TRANSFER message from the eNB (#2) 10-2, the MME 20-1 transmits the MME CONFIGURATION TRANSFER message to the eNB (#1) 10-1 (step 105). Contents of the SON Information Request IE in this MME CONFIGURATION TRANSFER message is the same as the SON Information Reply IE of the eNB CONFIGURATION TRANSFER message received from the eNB (#2) 10-2.

Further, when the MME 20-1 receives the eNB CONFIGURATION TRANSFER message from the eNB (#3) 10-3, the MME 20-1 transmits the MME CONFIGURATION TRANSFER message to the eNB (#1) 10-1 (step 107). Contents of the SON Information Request IE in this MME CONFIGURATION TRANSFER message is the same as the SON Information Reply IE of the eNB CONFIGURATION TRANSFER message received from the eNB (#3) 10-3.

When Muting Availability Indication IEs of the eNB (#2) 10-2 and the eNB (#3) 10-3 are set to "available" indicating that muting is available in the case A, one of a subsequent case B or case C is executed.

Case B)

In the case B, the eNB (#1) 10-1 starts over-the-air synchronisation with the eNB (#3) 10-3. It is assumed that the eNB (#1) 10-1 has detected an interference from the eNB (#2) 10-2. This will be described in detail with reference to FIG. 3.

The eNB (#1) 10-1 transmits the eNB CONFIGURATION TRANSFER message to a MME (the MME 20-1 in this case) (step 201). In this eNB CONFIGURATION TRANSFER message, a value "Active Muting" is set to the SON Information Request IE, and the Synchronisation Information IE contains a Source Stratum Level IE (level "0"). That is, this eNB CONFIGURATION TRANSFER message is a muting request for requesting activation of muting of the synchronisation signal according to a synchronisation signal transmission pattern of the eNB (#3) 10-3.

When the MME 20-1 receives the eNB CONFIGURATION TRANSFER message from the eNB (#1) 10-1, the MME 20-1 transmits the MME CONFIGURATION TRANSFER message to the eNB (#2) 10-2 (step 202). Contents of the SON Information Request IE in this MME CONFIGURATION TRANSFER message is the same as the SON Information Request IE of the eNB CONFIGURATION TRANSFER message received from the eNB (#1) 10-1.

When the eNB (#2) 10-2 receives the MME CONFIGURATION TRANSFER message from the MME 20-1, the eNB (#2) 10-2 decides whether or not to meet the muting request, and transmits the eNB CONFIGURATION TRANSFER message which reflects this decision result to the MME 20-1 (step 203).

Case B-1)

For example, the eNB (#2) 10-2 meets the muting request. In this case, in the eNB CONFIGURATION TRANSFER message, the SON Information Reply IE contains the Muting Pattern Information IE, and the Muting Pattern Information IE contains a Muting Pattern Period IE which represents a muting period, and a Muting Pattern Offset IE which represents a muting start point as an offset (which represents a time from a reference time and applies likewise below). Values of these IEs are the same as a pattern value of the level "0". Alternately, the eNB (#2) 10-2 does not make a response by any message.

Case B-2)

Further, the eNB (#2) 10-2 does not meet the muting request yet proposes an alternative muting pattern. In this case, in the eNB CONFIGURATION TRANSFER message, the SON Information Reply IE contains the Muting Pattern Information IE, and the Muting Pattern Information IE contains the above Muting Pattern Period IE and Muting Pattern Offset IE. In this regard, values of these IEs are different from a pattern value of the level "0".

Case B-3)

Further, the eNB (#2) 10-2 does not meet the muting request, and does not propose an alternative muting pattern, either. In this case, in the eNB CONFIGURATION TRANSFER message, the SON Information Reply IE contains the Muting Pattern Information IE, and the Muting Pattern Information IE contains the Muting Pattern Period IE whose value is set to "0" (i.e., to which a muting period is not set).

In this regard, the eNB (#2) 10-2 does not respond to the MME 20-1 by the Time Synchronisation Info ID in the case B. Consequently, the MME 20-1 and the eNB (#1) 10-1 which is a connection destination of the MME 20-1 do not need to process the Time synchronisation Info IE, so that a processing load is reduced.

When the MME 20-1 receives the eNB CONFIGURATION TRANSFER message from the eNB (#2) 10-2, the MME 20-1 transmits the MME CONFIGURATION TRANSFER message to the eNB (#1) 10-1 (step 204). Contents of the SON Information Request IE in this MME CONFIGURATION TRANSFER message is the same as the SON Information Reply IE of the eNB CONFIGURATION TRANSFER message received from the eNB (#2) 10-2.

Subsequently, the eNB (#1) 10-1 starts over-the-air synchronisation with the eNB (#3) 10-3 in the case B-1.

Further, in the case B-2, the eNB (#1) 10-1 tries over-the-air synchronisation with another synchronisation source eNB other than the eNB (#3) 10-3 according to the alternative muting pattern proposed by the eNB (#2) 10-2, and does nothing if the over-the-air synchronisation cannot be established.

Furthermore, in the case B-3, the eNB (#1) 10-1 does nothing.

In the case B-1 or the case B-2, the eNB (#1) 10-1 starts over-the-air synchronisation, and then one of a subsequent case D and case E is executed.

Case C)

In the case C, the eNB (#1) 10-1 starts over-the-air synchronisation with the eNB (#3) 10-3. In this regard, it is assumed that the eNB (#1) 10-1 has detected an interference from the eNB (#2) 10-2. This will be described in detail with reference to FIG. 3.

The eNB (#1) 10-1 transmits the eNB CONFIGURATION TRANSFER message to a MME (the MME 20-1 in this case) (step 201). In this eNB CONFIGURATION TRANSFER message, the value "Activate Muting" is set to the SON Information Request IE, and the Synchronisation Information IE contains a Listening Subframe Pattern IE (containing the Pattern Period IE which represents a muting period and a Pattern Offset IE which represents a muting start point as an offset). That is, this eNB CONFIGURATION TRANSFER message is a muting request for requesting activation of muting of a synchronisation signal during a period represented by the Pattern Period IE from the start point represented by the Pattern Offset IE.

When the MME 20-1 receives the eNB CONFIGURATION TRANSFER message from the eNB (#1) 10-1, the MME 20-1 transmits the MME CONFIGURATION TRANSFER message to the eNB (#2) 10-2 (step 202). Contents of the SON Information Request IE in this MME CONFIGURATION TRANSFER message is the same as the SON Information Request IE of the eNB CONFIGURATION TRANSFER message received from the eNB (#1) 10-1.

When the eNB (#2) 10-2 receives the MME CONFIGURATION TRANSFER message from the MME 20-1, the eNB (#2) 10-2 decides whether or not to meet the muting request, and transmits the eNB CONFIGURATION TRANSFER message which reflects this decision result to the MME 20-1 (step 203).

Case C-1)

For example, the eNB (#2) 10-2 meets the muting request. In this case, in the eNB CONFIGURATION TRANSFER message, the SON Information Reply IE contains the Muting Pattern Information IE, and the Muting Pattern Information IE contains the Muting Pattern Period IE which represents a muting period, and the Muting Pattern Offset IE which represents a muting start point as an offset. Values of these IEs are the same as the value of the muting request. Alternatively, the eNB (#2) 10-2 does not make a response by any message.

Case C-2)

Further, the eNB (#2) 10-2 does not meet the muting request yet proposes an alternative muting pattern. In this case, in the eNB CONFIGURATION TRANSFER message, the SON Information Reply IE contains the Muting Pattern Information IE, and the Muting Pattern Information IE contains the above Muting Pattern Period IE and Muting Pattern Offset IE. In this regard, values of these IEs are different from the value of the muting request.

Case C-3)

Further, the eNB (#2) 10-2 does not meet the muting request and does not propose an alternative muting pattern, either. In this case, in the eNB CONFIGURATION TRANSFER message, the SON Information Reply IE contains the Muting Pattern Information IE, and the Muting Pattern Information IE contains the Muting Pattern Period IE whose value is set to "0" (i.e., to which a muting period is not set).

In this regard, the eNB (#2) 10-2 does not respond to the MME 20-1 by the Time synchronisation Info IE in the case C. Consequently, the MME 20-1 and the eNB (#1) 10-1 which is a connection destination of the MME 20-1 do not need to process the Time synchronisation Info IE, so that a processing load is reduced.

When the MME 20-1 receives the eNB CONFIGURATION TRANSFER message from the eNB (#2) 10-2, the MME 20-1 transmits the MME CONFIGURATION TRANSFER message to the eNB (#1) 10-1 (step 204). Contents of the SON Information Request IE in this MME CONFIGURATION TRANSFER message is the same as the SON Information Reply IE of the eNB CONFIGURATION TRANSFER message received from the eNB (#2) 10-2.

Subsequently, the eNB (#1) 10-1 starts over-the-air synchronisation with the eNB (#3) 10-3 in the case C-1.

Further, in the case C-2, the eNB (#1) 10-1 tries over-the-air synchronisation with another synchronisation source eNB other than the eNB (#3) 10-3 according to an alternative muting pattern proposed by the eNB (#2) 10-2, and does nothing if the over-the-air synchronisation cannot be established.

Furthermore, in the case C-3, the eNB (#1) 10-1 does nothing.

In the case C-1 or the case C-2, the eNB (#1) 10-1 starts over-the-air synchronisation, and then one of the subsequent case D or case E is executed.

Case D)

In the case D, the eNB (#1) 10-1 finishes over-the-air synchronisation, and determines to request the eNB (#2) 10-2 to deactivate muting. This will be described in detail below with reference to FIG. 4.

The eNB (#1) 10-1 transmits the eNB CONFIGURATION TRANSFER message to a MME (MME 20-1 in this case) (step 301). In this eNB CONFIGURATION TRANSFER message, a value "Deactivate Muting" is set to the SON Information Request IE. That is, this eNB CONFIGURATION TRANSFER message is a muting deactivate request for requesting deactivation of muting.

When the MME 20-1 receives the eNB CONFIGURATION TRANSFER message from the eNB (#1) 10-1, the MME 20-1 transmits the MME CONFIGURATION TRANSFER message to the eNB (#2) 10-2 (step 302). Contents of the SON Information Request IE in this MME CONFIGURATION TRANSFER message is the same as the SON Information Request IE of the eNB CONFIGURATION TRANSFER message received from the eNB (#1) 10-1.

When the eNB (#2) 10-2 receives the MME CONFIGURATION TRANSFER message from the MME 20-1, the eNB (#2) 10-2 deactivates muting. In this case, the eNB (#2) 10-2 does not transmit any response message.

Case E)

In the case E, the eNB (#2) 10-2 stops muting, and determines to notify the eNB (#1) 10-1 of the stop of the muting. This will be described in detail below with reference to FIG. 5.

The eNB (#2) 10-2 transmits the eNB CONFIGURATION TRANSFER message to the MME 20-1 (step 401). In this eNB CONFIGURATION TRANSFER message, the value "Deactivate Muting" is set to the SON Information Request IE. That is, this eNB CONFIGURATION TRANSFER message is a deactivate request for requesting deactivation of muting to an own base station, and notifying other base stations of this deactivation.

When the MME 20-1 receives the eNB CONFIGURATION TRANSFER message from the eNB (#2) 10-2, the MME 20-1 transmits the MME CONFIGURATION TRANSFER message to the eNB (#1) 10-1 (step 402). Contents of the SON Information Request IE in this MME CONFIGURATION TRANSFER message is the same as the SON Information Request IE of the eNB CONFIGURATION TRANSFER message received from the eNB (#2) 10-2.

The eNB (#1) 10-1 does not transmit any response message.

CITATION LIST

Non Patent Literature

NPL 1: 3GPP TS 36.413 V12.4.0 (2014-12):S1 Application Protocol (S1AP)

SUMMARY OF INVENTION

Technical Problem

However, the above muting procedure has the following problems.

Problem 1)

The Muting Pattern Information IE and the Muting Pattern Offset IE of the SON Information Reply IE are options. Therefore, when the Muting Pattern Period IE received in step 204 in FIG. 3 indicates a value other than "0" (i.e., when the muting periods is set) in the case B and the case C, if the Muting Pattern Offset IE is not present, the eNB (#1) 10-1 cannot decide how to make interpretation.

Problem 2)

In the case B and the case C, the eNB (#2) 10-2 receives the muting request from the eNB (#1) 10-1 via the MME 20-1 in step 202 in FIG. 3, and then does not make a response by the Time Synchronisation Info IE (i.e., when the eNB (#2) 10-2 receives the SON Information IE containing the SON Information Request IE to which "Activate Muting" is set, the eNB (#2) 10-2 does not make a response by the Time Synchronisation IE). However, there is no specification which describes about this problem, and therefore the eNB (#2) 10-2 tries to make a response by the Time Synchronisation Info IE. Then, a reception side (i.e., eNB (#1) 10-1) does not know a method for processing the Time Synchronisation Info IE, and therefore a procedure which cannot be executed occurs.

Problem 3)

In the case D, the eNB (#2) 10-2 receives the muting deactivate request from the eNB (#1) 10-1 via the MME 20-1 in step 302 in FIG. 4, and then does not make a response by any message (i.e., when the eNB (#2) 10-2 receives the SON Information IE containing the SON Information Request IE to which "Deactivate Muting" is set, the eNB (#2) 10-2 does not make a response by any message). However, there is no specification which describes this problem, and therefore the eNB (#2) 10-2 tries to make a response by a message containing an option IE such as the Time Synchronisation Info IE. Then, the reception side (i.e., eNB (#1) 10-1) does not know a method for processing this message and a relevant IE, and therefore a procedure which cannot be executed occurs.

Problem 4)

In the case E, the eNB (#1) 10-1 receives the muting deactivate request from the eNB (#2) 10-2 via the MME 20-1 in step 402 in FIG. 5, and then does not make a response by any message (i.e., when the eNB (#1) 10-1 receives the SON Information IE containing the SON Information Request IE to which "Deactivate Muting" is set, the eNB (#1) 10-1 does not make a response by any message). However, there is no specification which describes this problem, and therefore the eNB (#1) 10-1 tries to make a response by a message containing an option IE such as the Time Synchronisation Info IE. Then, the reception side (i.e., eNB (#2) 10-2) does not know a method for processing this message and a relevant IE, and therefore a procedure which cannot be executed occurs.

It is therefore an object of the present invention to provide a base station, a wireless communication system and a communication method which can solve one of the above problems.

Solution to Problem

According to one aspect, when a base station receives Muting Pattern Information that does not contain a Muting Pattern Offset, the base station decides that the Muting Pattern Offset requested in a former request has been accepted.

According to another aspect, when a base station transmits a message for requesting Active Muting, and then receives Muting Pattern Information that does not contain a Muting Pattern Offset, the base station decides that a Muting Pattern Offset requested in a former request has been accepted.

According to still another aspect, when a base station receives a message that does not contain an information element related to muting, the base station decides that the information element related to previously requested muting has been accepted.

Advantageous Effects of Invention

According to the above aspect, it is possible to prevent transmission of Time Synchronisation Info IE from causing a procedure which a base station cannot execute, and contribute to solution of one of the above problems.

BRIEF DESCRIPTION OF DRAWINGS

FIG. 6 is a view illustrating an example of a Muting Pattern Information IE according to the present embodiment.

FIG. 7 is a view illustrating an example of the Muting Pattern Information IE according to the present embodiment.

FIG. 8 is a view illustrating an example of a SON Configuration Transfer IE according to the present embodiment.

FIG. 9 is a view illustrating an example of a SON Information IE according to the present embodiment.

DESCRIPTION OF EMBODIMENTS

The embodiment of the present invention will be described below with reference to the drawings.

Figure 1:
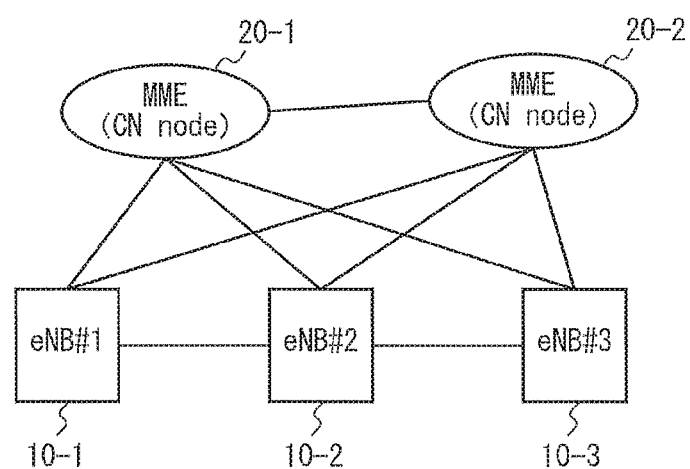
FIG. 1 is a view illustrating a configuration example of a wireless communication system of LTE.
Figure 2:
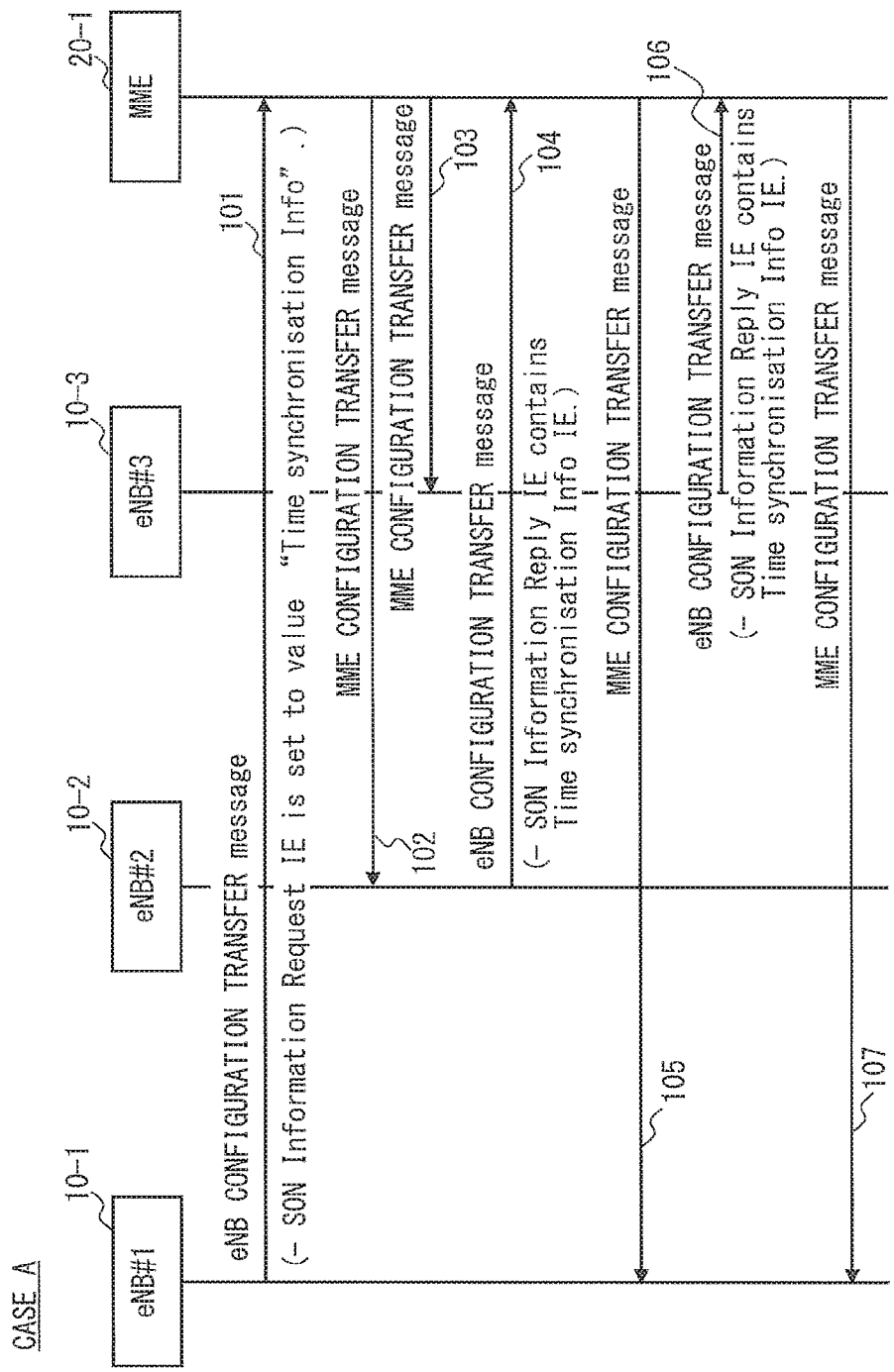
FIG. 2 is a sequence diagram for explaining an example of a case A of muting procedure.

The present embodiment employ the same entire configuration of a wireless communication system as that in FIG. 1, yet add new functions to an eNB (#1) 10-1, an eNB (#2) 10-2 and an eNB (#3) 10-3 to solve above problems 1 to 4. In the present embodiment, methods for solving the above problems 1 to 4 are as follows.

(1) Method for Solving Problem 1

Figure 3:
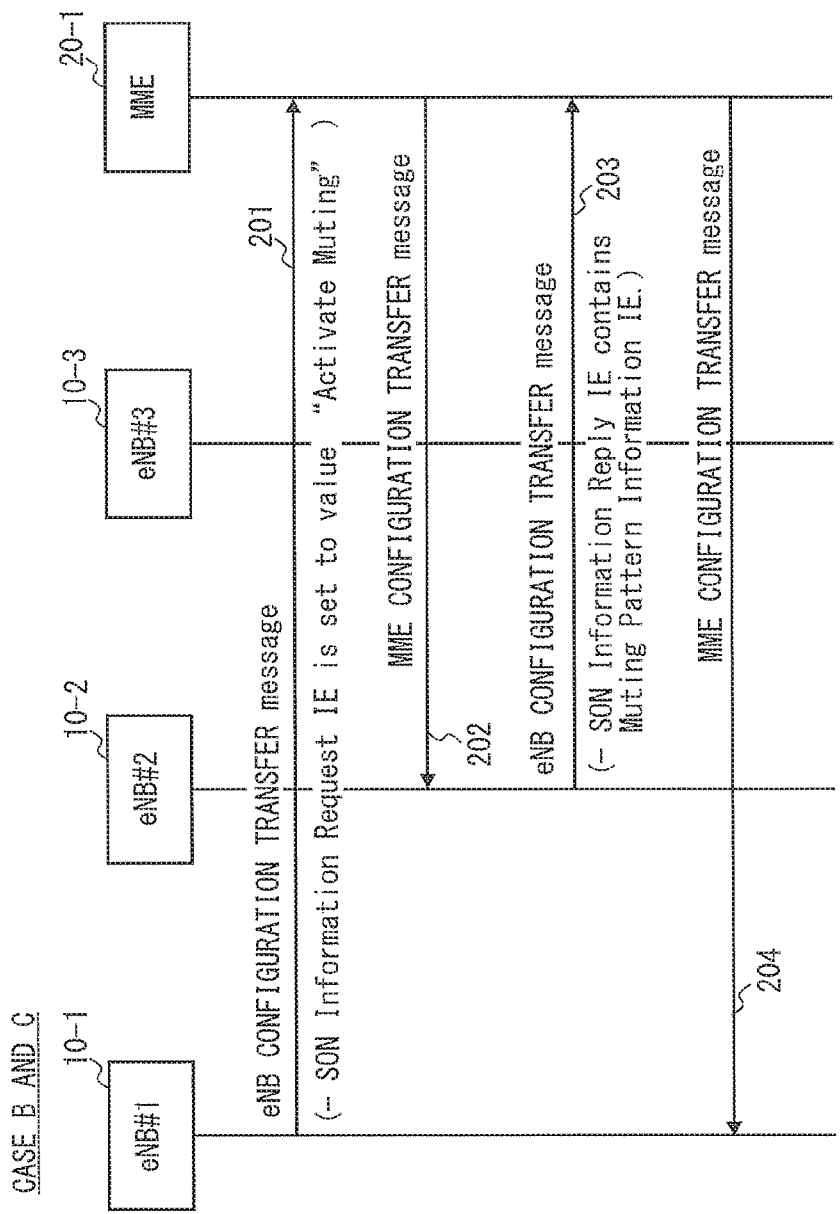
FIG. 3 is a sequence diagram for explaining examples of cases B and C of the muting procedure.

The problem 1 is that, in a case B and a case C, when a Muting Pattern Period IE received in step 204 in FIG. 3 indicates a value other than "0", if a Muting Pattern Offset IE is not present, the eNB (#1) 10-1 cannot decide how to make interpretation.

(1-1) Solving Method 1

The solving method 1 changes a Muting Pattern Information IE as illustrated in FIG. 6 (changed portions are underlined).

In FIG. 6, under a condition that the Muting Pattern Period IE is other than 0 ("C-ifOtherThanZero") in the Muting Pattern Information IE (i.e., a condition that a muting period is set), the Muting pattern Offset IE which represents an offset is always present. In this regard, "C-ifOtherThanZero" may be "C-ifNotZero".

When the Muting Pattern Period IE is other than 0, the eNB (#2) 10-2 or the eNB (#3) 10-3 transmits to the eNB (#1) 10-1 the Muting Pattern Information IE to which the Muting Pattern Offset IE is set. Hence, when the Muting Pattern Period IE is other than 0, the eNB (#1) 10-1 can process the Muting Pattern Information IE transmitted from the eNB (#2) 10-2 or the eNB (#3) 10-3. Meanwhile, when, although the Muting Pattern Period IE is other than 0, the eNB (#2) 10-2 or the eNB (#3) 10-3 transmits to the eNB (#1) 10-1 the Muting Pattern Information IE to which the Muting Pattern Offset IE is not set, the eNB (#1) 10-1 may process the Muting Pattern Information IE as Abnormal.

In the example in FIG. 3, the Muting Pattern Information IE is transmitted from the eNB (#2) 10-2 in step 203, and is received by the eNB (#1) 10-1 in step 204.

Consequently, when the Muting Pattern Period IE indicates a value other than "0", the eNB (#1) 10-1 can expect that the Muting Pattern Offset IE is always present. When this condition, i.e., that, although the Muting Pattern Period IE is other than 0, the Muting Pattern Offset IE is not present occurs, the eNB (#1) 10-1 processes this condition as Abnormal.

(1-2) Solving Method 2

The solving method 2 changes the Muting Pattern Information IE as illustrated in FIG. 7 (a changed portion is underlined).

FIG. 7 illustrates added processing in a case where the Muting Pattern Offset is not present.

When the eNB (#1) 10-1 receives a SON Information IE containing a SON Information Reply IE containing the Muting Pattern Information IE as a reply to a muting request which is a former request, the eNB (#1) 10-1 uses the SON Information IE to perform over-the-air synchronisation by using network listening.

In this case, when the Muting Pattern Offset IE is not present, the eNB (#1) 10-1 decides that an offset requested in the former request has been accepted.

Consequently, when the Muting Pattern Period IE indicates a value other than "0", even if the Muting Pattern Offset IE is not present, the eNB (#1) 10-1 can decide how to make interpretation.

(2) Method for Solving Problem 2

The problem 2 is that, in the case B and the case C, when the eNB (#2) 10-2 receives the muting request from the eNB (#1) 10-1 via a MME 20-1 in step 202 in FIG. 3 and then tries to make a response by a Time Synchronisation Info IE, a reception side (i.e., eNB (#1) 10-1) does not know a method for processing the Time Synchronisation Info IE, and therefore a procedure which cannot be executed occurs.

To solve the problem 2, an abnormal condition is added in the present embodiment in preparation for a case where the eNB (#2) 10-2 receives the muting request from the eNB (#1) 10-1 (i.e., the eNB (#2) 10-2 receives the SON Information IE containing the SON Information Request IE to which "Activate Muting" is set), and transmits a response by the Time Synchronisation Info IE.

Variation 1 of Abnormal Condition)

When the eNB (#1) 10-1 receives the SON Information IE containing the SON Information Reply IE containing the Time Synchronisation Info IE as a reply to the muting request which is the former request (i.e., the SON Information IE in this former request contains the SON Information Request IE to which "Activate Muting" is set), the eNB (#1) 10-1 decides that this muting request has failed.

Variation 2 of Abnormal Condition)

When the eNB (#1) 10-1 receives the SON Information IE containing the SON Information Reply IE containing the Time Synchronisation Info IE as a reply to the muting request which is the former request (i.e., the SON Information IE in this former request contains the SON Information Request IE to which "Activate Muting" is set), the eNB (#1) 10-1 decides that this muting request has failed, and transmits an Error Indication message which represents an error to a MME 20-1 or 20-2.

Variation 3 of Abnormal Condition)

When the eNB (#1) 10-1 receives the SON Information IE containing the SON Information Reply IE containing the Time Synchronisation Info IE as a reply to the muting request which is the former request (i.e., the SON Information IE in this former request contains the SON Information Request IE to which "Activate Muting" is set), the eNB (#1) 10-1 ignores the Time Synchronisation Info IE.

Variation 4 of Abnormal Condition)

When the eNB (#1) 10-1 receives the SON Information IE containing the SON Information Reply IE containing the Time Synchronisation Info IE as a reply to the muting request which is the former request (i.e., the SON Information IE in this former request contains the SON Information Request IE to which "Activate Muting" is set), the eNB (#1) 10-1 decides that this muting request has failed, and transmits to the MME 20-1 or 20-2 an eNB CONFIGURATION TRANSFER message which contains the SON Information IE containing the SON Information Request IE to which the "Error Indication" representing an error is set, and in which an appropriate Cause value representing an error cause is set to a Cause IE.

Consequently, when the eNB (#2) 10-2 transmits the Time Synchronisation Info IE, it is possible to prevent this transmission from causing a procedure which the eNB (#1) 10-1 cannot execute.

(3) Method for Solving Problems 3 and 4

Figure 4:
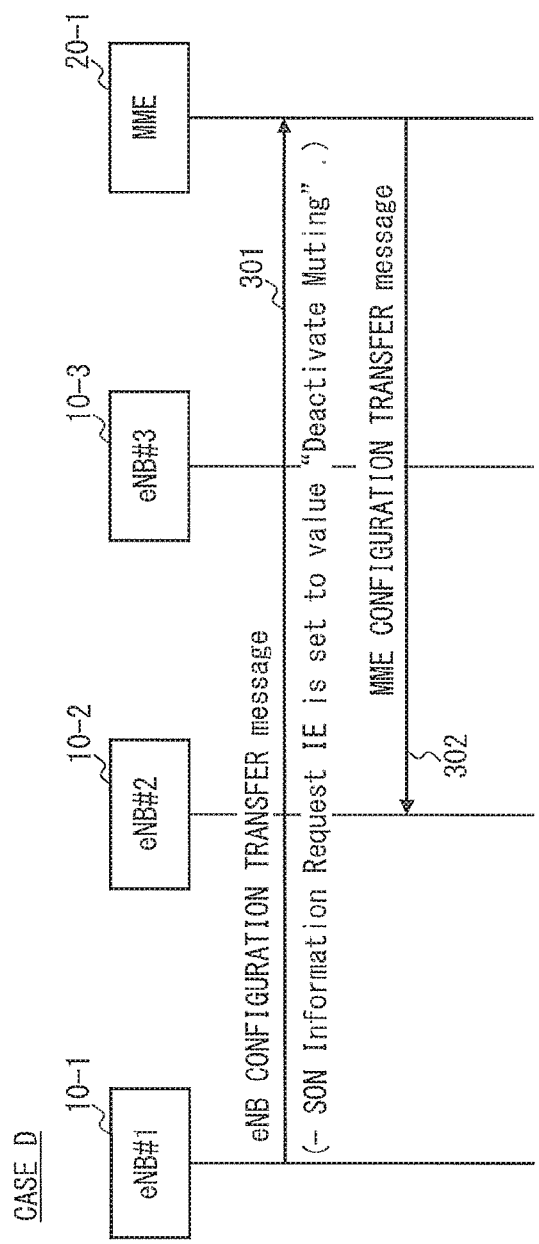
FIG. 4 is a sequence diagram for explaining an example of a case D of the muting procedure.

The problem 3 is that, in the case D, when the eNB (#2) 10-2 receives a muting deactivate request from the eNB (#1) 10-1 via the MME 20-1 in step 302 in FIG. 4, and then tries to make a response by a message containing an option IE such as the Time Synchronisation Info IE, the reception side (i.e., eNB (#1) 10-1) does not know a method for processing this message and a relevant IE, and therefore a procedure which cannot be executed occurs.

Figure 5:
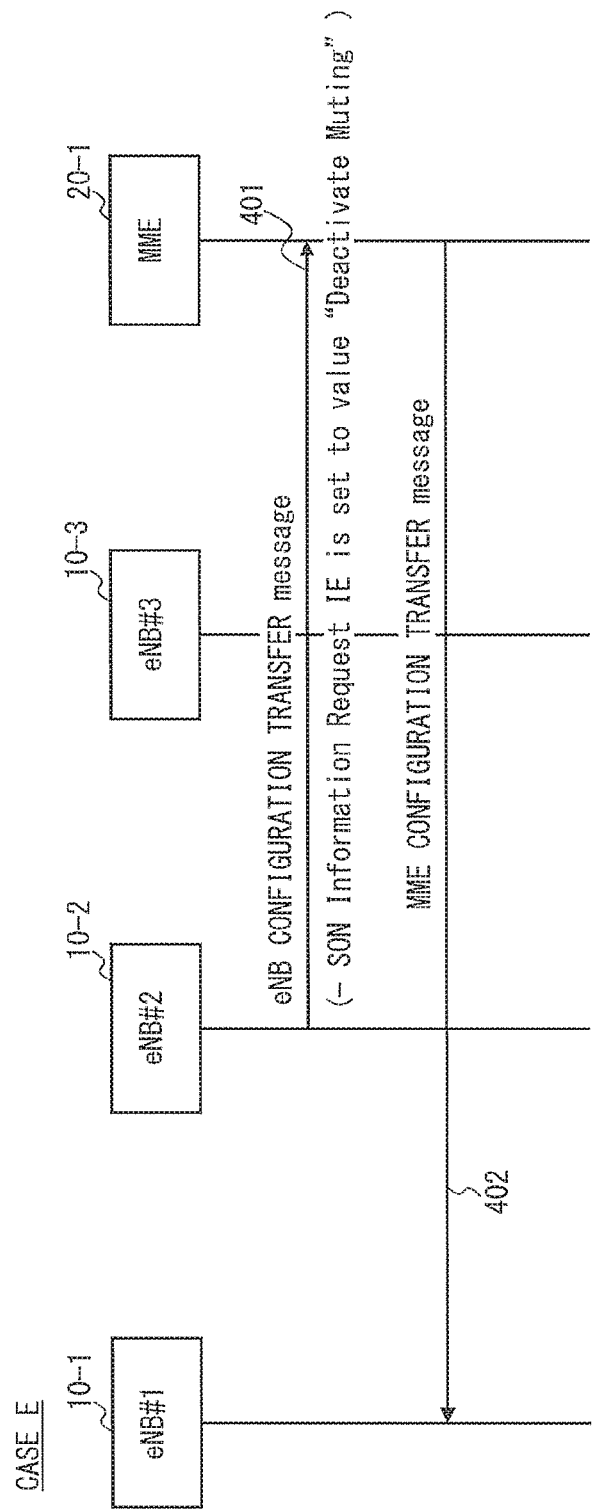
FIG. 5 is a sequence diagram for explaining an example of a case E of the muting procedure.

The problem 4 is that, in the case E, when the eNB (#1) 10-1 receives the muting deactivate request from the eNB (#2) 10-2 via the MME 20-1 in step 402 in FIG. 5, and then tries to make a response by the message containing an option IE such as the Time Synchronisation Info IE, the reception side (i.e., eNB (#2) 10-2) does not know the method for processing this message and a relevant IE, and therefore the procedure which cannot be executed occurs.

To solve the problems 3 and 4, an abnormal condition is added in the present embodiment in preparation for a case where the eNB (#1) 10-1 (or eNB (#2) 10-2) receives the muting deviate request from the eNB (#2) 10-2 (or eNB (#1) 10-1) (i.e., the eNB (#1) 10-1 (or eNB (#2) 10-2) receives the SON Information IE containing the SON Information Request IE to which "Deactivate Muting" is set), and then transmits a response message containing the Time Synchronisation Info IE.

Variation 1 of Abnormal Condition)

When the eNB (#1) 10-1 and the eNB (#2) 10-2 receive the SON Information IE containing the SON Information Reply IE which can contain the Time Synchronisation Info IE as a reply to the deactivate muting request which is the former request (i.e., the SON Information IE in this former request contains the SON Information Request IE to which "Deactivate Muting" is set), the eNB (#1) 10-1 and the eNB (#2) 10-2 decide that this deactivate muting request has failed.

Variation 2 of Abnormal Condition)

When the eNB (#1) 10-1 and the eNB (#2) 10-2 receive the SON Information IE containing the SON Information Reply IE which can contain the Time Synchronisation Info IE as a reply to the deactivate muting request which is the former request (i.e., the SON Information IE in this former request contains the SON Information Request IE to which "Deactivate Muting" is set), the eNB (#1) 10-1 and the eNB (#2) 10-2 decide that this deactivate muting request has failed, and transmit the Error Indication message which represents an error to the MME 20-1 or 20-2.

Variation 3 of Abnormal Condition)

When the eNB (#1) 10-1 and the eNB (#2) 10-2 receive the SON Information IE containing the SON Information Reply IE which can contain the Time Synchronisation Info IE as a reply to the deactivate muting request which is the former request (i.e., the SON Information IE in this former request contains the SON Information Request IE to which "Deactivate Muting" is set), the eNB (#1) 10-1 and the eNB (#2) 10-2 ignore this response message or ignore the Time Synchronisation Info IE.

Variation 4 of Abnormal Condition)

When the eNB (#1) 10-1 and the eNB (#2) 10-2 receive the SON Information IE containing the SON Information Reply IE which can contain the Time Synchronisation Info IE as a reply to the deactivate muting request which is the former request (i.e., the SON Information IE in this former request contains the SON Information Request IE to which "Deactivate Muting" is set), the eNB (#1) 10-1 and the eNB (#2) 10-2 decide that this deactivate muting request has failed, and transmits to the MME 20-1 or 20-2 the eNB CONFIGURATION TRANSFER message which contains the SON Information IE containing the SON Information Request IE to which the "Error Indication" representing an error is set, and in which the appropriate Cause value representing the error cause is set to the Cause IE.

Consequently, when the eNB (#1) 10-1 (or eNB (#2) 10-2) transmit the Time Synchronisation Info IE, it is possible to prevent this transmission from causing a procedure which the eNB (#2) 10-2 (or eNB (#1) 10-1) cannot execute.

FIG. 8 illustrates an example of the SON Configuration Transfer IE in a case where the variation 4 of the abnormal condition according to the methods for solving the problems 2, 3 and 4 is realized, and FIG. 9 illustrates an example of the SON Information IE.

Figure 10:
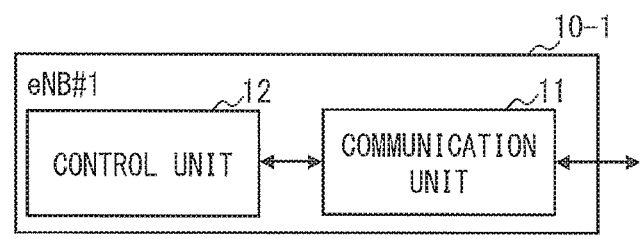
FIG. 10 is a block diagram illustrating a configuration example of an eNB according to the present embodiment.

Lastly, a configuration example of the eNB (#1) 10-1, the eNB (#2) 10-2 and the eNB (#3) 10-3 will be described. FIG. 10 is a block diagram illustrating the configuration example of the eNB (#1) 10-1. The eNB (#1) 10-1 illustrated in FIG. 10 includes a communication unit 11 and a control unit 12. The communication unit 11 performs processing of communicating with the MMEs 20-1 and 20-2, the eNB (#2) 10-2 and the eNB (#3) 10-3. The control unit 12 is connected to the communication unit 11, and realizes various functions of the eNB (#1) 10-1 by executing programs read from a memory which is not illustrated. The communication unit 11 and the control unit 12 can be realized by a processor. In this regard, the configurations of the eNB (#2) 10-2 and the eNB (#3) 10-3 are also the same as that of the eNB (#1) 10-1.

The present invention has been described above with reference to the embodiment. However, the present invention is not limited to the above. Various changes which one of ordinary skill in the art can understand can be made to the configurations and the details of the present invention without departing from the scope of the invention.

For example, eNBs communicate via a MME in the embodiment. However, the eNBs may directly communicate via an X2 interface.

Further, the eNB (#1) 10-1 which establishes time synchronisation with the eNB (#3) 10-3 is a pico eNB. However, the eNB (#1) 10-1 may be a femto eNB or a HeNB (Home eNB).

This application claims priority to Japanese Patent Application No. 2015-100153 filed on May 15, 2015, the entire contents of which are incorporated by reference herein.

REFERENCE SIGNS LIST

10-1 to 10-3 eNB
20-1, 20-2 MME

11 COMMUNICATION UNIT
12 CONTROL UNIT

The invention claimed is:

1. A base station comprising:
a memory; and
a processor configured to communicate with a node,
wherein the base station receives Pattern Information that does not contain a Muting Pattern Offset, and decides that a Muting Pattern Offset, requested in a former request included in an eNB Configuration Transfer message sent to a Mobile Management Entity (MIME), has been accepted.

2. The base station according to claim 1, wherein the Muting Pattern Information is an information element that is transmitted by another base station and transferred by a MME.

3. The base station according to claim 1, wherein a value of a Muting Pattern Period contained in the Muting Pattern Information is not zero.

4. The base station according to claim 1, wherein the former request contains a Muting Pattern Period and the Muting Pattern Offset.

5. The base station according to claim 1, wherein the former request is a message for requesting Active Muting.

6. The base station according to claim 1, wherein the former request is a message that is sent from the base station.

7. A base station comprising:
a memory; and
a processor configured to communicate with a node,
wherein the base station transmits a message for requesting Active Muting, receives Muting Pattern Information that does not contain a Muting Pattern Offset, and decides that a Muting Pattern Offset, requested in a former request included in an eNB Configuration Transfer message sent to a Mobile Management Entity (MIME), has been accepted.

8. The base station according to claim 7, wherein the message contains a Source Stratum Level IE.

9. The base station according to claim 7, wherein the message contains a Muting Pattern Period and a Muting Pattern Offset.

10. The base station according to claim 7, wherein the Muting Pattern Information is transmitted as a response to the message.

11. The base station according to claim 7, wherein the former request is the message for requesting Active Muting.

12. A base station comprising:
a memory; and
a processor configured to communicate with a node and transmit a request including a Muting Pattern Period and a Muting Pattern Offset to another base station,
wherein the base station receives Muting Pattern Information that does not contain a Muting Pattern Offset after transmitting the request to the another base station, and decides that the Muting Pattern Offset, requested in the request included in an eNB Configuration Transfer message sent to a Mobile Management Entity (MME), has been accepted by the another base station.

* * * * *